(12) United States Patent
Stattin et al.

(10) Patent No.: US 7,050,828 B2
(45) Date of Patent: May 23, 2006

(54) INTER-SYSTEM MONITOR FUNCTION

(75) Inventors: Hans Stattin, Malmö (SE); Martin Hellmark, Lund (SE); Martin Åkerberg, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 378 days.

(21) Appl. No.: 10/654,162

(22) Filed: Sep. 3, 2003

(65) Prior Publication Data

US 2004/0092286 A1 May 13, 2004

Related U.S. Application Data

(60) Provisional application No. 60/412,831, filed on Sep. 23, 2002.

(51) Int. Cl.
*H04B 1/44* (2006.01)
*H04B 1/00* (2006.01)

(52) U.S. Cl. .............................. 455/553.1; 455/552.1; 455/562.1

(58) Field of Classification Search ............. 455/552.1, 455/553.1, 562.1, 575.7, 130, 78, 79, 82, 455/83, 84, 134, 136, 232.1, 234.1, 234.2, 455/249.1, 571, 572
See application file for complete search history.

(56) References Cited

U.S. PATENT DOCUMENTS

| | | | |
|---|---|---|---|
| 6,774,857 B1 * | 8/2004 | Frank | 343/702 |
| 2003/0053569 A1 * | 3/2003 | Vilhonen | 375/345 |
| 2004/0097189 A1 * | 5/2004 | Bongfeldt et al. | 455/7 |

* cited by examiner

*Primary Examiner*—George Eng
*Assistant Examiner*—Sam Bhattacharya

(57) ABSTRACT

Method and apparatus for monitoring one or more telecommunications systems supported by a wireless device with respect to which the wireless device is in an idle mode while the wireless device is in a connected mode with respect to another supported system. The apparatus includes an air interface, at least two access means for providing the wireless device with access to at least two supported telecommunications systems, and a circuit having a connection to the air interface and a plurality of connections to the at least two access means. The circuit provides a low attenuation between the air interface connection and a connection to the access means that provides the wireless device with access to a system with respect to which the wireless device is in a connected mode, and further includes means for setting the circuit to at least two states, wherein each of the at least two states provides a different attenuation between the air interface connection and one of the plurality of connections to the at least two access means.

9 Claims, 1 Drawing Sheet

INTER-SYSTEM MONITOR FUNCTION

This patent application claims the benefit of priority from and incorporates by reference of the entire disclosure of U.S. Provisional Patent Application Ser. No. 60/412,831 filed Sep. 23, 2002.

BACKGROUND OF THE INVENTION

1. Technical Field

The present invention relates generally to the field of wireless telecommunications; and, more particularly, to a method and apparatus for monitoring one or more telecommunications systems with respect to which a wireless device is in an idle mode while the wireless device is in a connected mode with respect to another system.

2. Description of Related Art

Wireless devices, such as mobile phones, often support multiple telecommunications systems, for example, the system standards GSM (Global System for Mobile Communications) and WCDMA (Wideband Code Division Multiple Access). When such a wireless device is in a connected mode with respect to one supported system, the device may have a need to monitor the one or more other supported systems with respect to which it is in an idle mode. For example, a mobile phone that is in a phone call (connected mode) in one system may have a need to monitor other systems in which it is in an idle mode in order to prepare for a hand-over between the connected system and one of the idle systems. In such a situation, the wireless device must be able to access the connected system and the one or more idle systems via an air interface of the wireless device.

With respect to a system in which the wireless device is in a connected mode, the wireless device transmits and receives user data via the air interface; and, using a receiver associated with the system in the connected mode, also acquires information about the environment of the system in the connected mode. With respect to systems in which the wireless device is in an idle mode, the wireless device uses receivers associated with the systems in the idle mode to acquire information about the environment of the systems in the idle mode. In such a situation, a transmitted signal on the air interface from a transmitter associated with the system in the connected mode may block or interfere with receivers of the systems that are in the idle mode unless suitable precautions are taken.

One known approach to overcoming the interference problem recognizes that the system with respect to which the wireless device is in the connected mode may support transmission gaps, e.g., idle frames in GSM or compressed mode in WCDMA. In such approach, the wireless device may use the transmission gaps to monitor the air interface with respect to a system in which the wireless device is in an idle mode without interference.

Another known approach to overcoming the interference problem is to provide the wireless device with a plurality of antennas, one for each supported system, such that each system can be independently accessed via the air interface.

The approach that utilizes transmission gaps requires that the one or more idle systems and the connected system be synchronized. For example, in a dual system GSM/WCDMA device, to monitor the GSM system, it is required to know the time of the WCDMA compressed mode gaps of the WCDMA system This requirement increases the over-all complexity of the wireless device. Also, for some systems, the transmission gaps have an adverse effect on network performance. For example, the compressed mode gaps in WCDMA reduces the capacity of the system, while the idle frames in GSM also impact the system, although to a lesser extent. An additional disadvantage is that each transmission gap offers only a limited time for monitoring, and the transmission gaps are only available at a limited rate as defined by the system.

The approach that utilizes a different antenna for each system supported by a wireless device requires isolation between the antennas in order to eliminate interference via the air interface. Isolation requirements between antennas in a wireless device restrict the mechanical design options of the device since the antennas usually need to be separated as much as possible. Also, in some wireless devices, it is desirable to have all the air interface signals for all the supported systems available in one common radio frequency interface. This is desirable, for example, in cars with an external antenna that allow only one radio frequency interface between the wireless device and the external antenna on the car.

There is, accordingly, a need for a method and apparatus for monitoring one or more systems with respect to which a wireless device is in an idle mode while the wireless device is in a connected mode with respect to another system, and that does not require using transmission gaps and that provides a negligible air interface interference.

SUMMARY OF THE INVENTION

The present invention provides a method and apparatus for monitoring one or more telecommunications systems supported by a wireless device with respect to which the wireless device is in an idle mode while the wireless device is in a connected mode with respect to another supported system.

In particular, in a wireless device that is capable of supporting at least two telecommunications systems, an apparatus is provided for monitoring one or more supported systems with respect to which the wireless device is in an idle mode while the wireless device is in a connected mode with respect to another supported system. The apparatus, according to an exemplary embodiment of the present invention comprises an air interface, at least two access means associated with the at least two supported telecommunications systems for providing the wireless device with access to the at least two systems, and a circuit having a connection to the air interface and a plurality of connections to the at least two access means. The circuit provides a low attenuation between the air interface connection and a connection of the plurality of connections to the access means that is associated with a supported system with respect to which the wireless device is in a connected mode, and further includes means for setting the circuit to at least two states, wherein each of the at least two states provides a different attenuation between the air interface connection and one of the plurality of connections to the at least two access means.

With embodiments of the present invention, when one of at least two telecommunications systems supported by a wireless device is in a connected mode, the circuit provides a low attenuation between an air interface connection and a connection to the access means associated with the system that is in a connected mode. At the same time, the circuit controls the attenuation between the air interface and a connection to the access means associated with the at least two systems to permit idle system monitoring. With the apparatus according to the present invention, it is not necessary to synchronize multiple systems in a wireless device when one of the systems is in a connected mode; and, in addition, the apparatus provides a negligible air interface interference between the connected system and any idle system.

In accordance with an exemplary embodiment of the present invention, the circuit also attenuates a transmit signal present on the connection to the access means associated with the system in a connected mode and the air interface connection to a receiver of an access means associated with any idle system so that the receiver is not blocked and will operate properly.

In accordance with further exemplary embodiments of the present invention, the at least two telecommunications systems comprise a WCDMA system and a GSM system, the circuit includes a diplexer, and the state setting means comprises a switch controllable between first and second states. In a still further exemplary embodiment of the invention, a method is provided for controlling a WCDMA receiver with Automatic Gain Control (AGC) during a GSM call by changing the response of the WCDMA receiver AGC to make it faster or slower.

Further advantages and specific details of embodiments of the present invention will become apparent hereinafter from the detailed description given below in conjunction with the following drawings.

DETAILED DESCRIPTION OF THE EXEMPLARY EMBODIMENTS OF THE INVENTION

Figure 1:
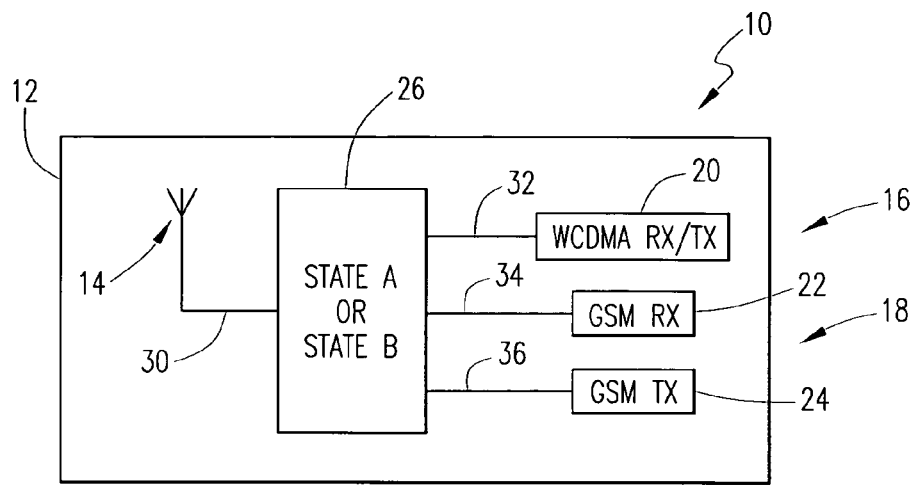
FIG. 1 is a block diagram that schematically illustrates an apparatus for monitoring a telecommunications system with respect to which a wireless device is in an idle mode while the wireless device is in a connected mode with respect to another system according to an exemplary embodiment of the present invention.

FIG. 1 is a block diagram that schematically illustrates an apparatus for monitoring a telecommunications system with respect to which a wireless device is in an idle mode while the wireless device is in a connected mode with respect to another system according to an exemplary embodiment of the present invention. The apparatus is generally designated by reference number 10 and is provided in a wireless device 12, such as a mobile phone, that supports both a GSM telecommunications system and a WCDMA telecommunications system.

As shown in FIG. 1, apparatus 10 includes an air interface 14 of the wireless device 12, and access means 16 and 18 for providing the wireless device with access to the WCDMA system and the GSM system, respectively. Access means 16 comprises a WCDMA receiver/transmitter 20, and access means 18 includes GSM receiver 22 and GSM transmitter 24. Apparatus 10 further includes a circuit 26 between the air interface 14 and the access means 16 and 18. Circuit 26 includes a connection 30 to the air interface, a connection 32 to the WCDMA receiver/transmitter 20, a connection 34 to the GSM receiver 22 and a connection 36 to the GSM transmitter 24. As shown in FIG. 1, circuit 26 is capable of being set to two different states, designated as State A and State B. The state of the circuit 26 is controlled by the system to which it is connected. For instance, if the wireless device 12 is in a WCDMA call, then the WCDMA system controls the circuit 26.

When circuit 26 of apparatus 10 is in State A, the circuit provides a low attenuation between connection 32 to WCDMA RX/TX 20 and air interface connection 30 for WCDMA receive/transmit signals. In addition, the circuit provides a low attenuation between connection 34 to GSM receiver 22 and air interface connection 30 for GSM receive signals. Furthermore, in State A, circuit 26 attenuates the WCDMA transmit signal, present on the WCDMA RX/TX connection 32 and the air interface connection 30, going to the GSM RX connection 34. Attenuation of the WCDMA transmit signal is needed so as not to block the GSM receiver so that the GSM receiver will operate properly.

When circuit 26 is in State B, the circuit has low attenuation between GSM TX connection 36 and air interface connection 30 for a GSM transmit signal. Furthermore, circuit 26 attenuates the GSM transmit signal present on the GSM TX connection 36 and the air interface connection 30, going to the WCDMA RX/TX connection 32. Attenuation of the GSM transmit signal is needed so as not to block the WCDMA receiver, so that the WCDMA receiver will operate properly.

Figure 2:
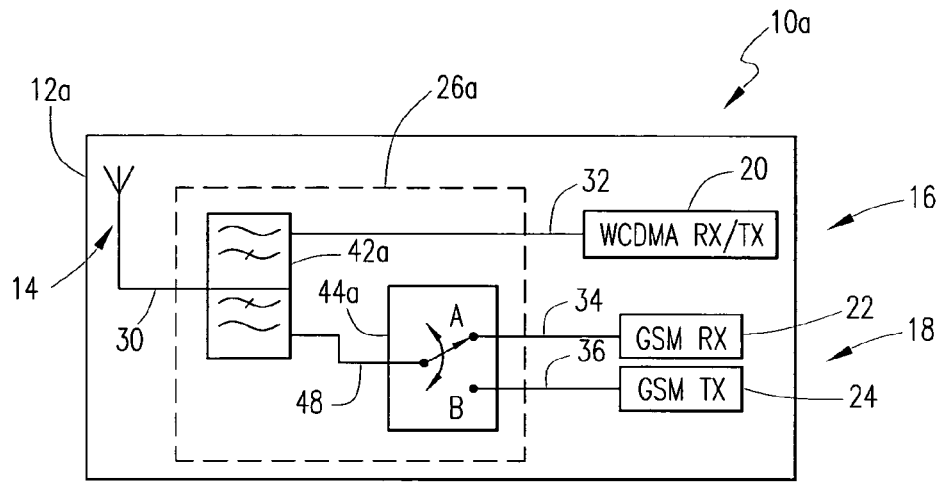
FIG. 2 is a block diagram that schematically illustrates an implementation of the apparatus of FIG. 1 according to another exemplary embodiment of the present invention.

FIG. 2 is a block diagram that schematically illustrates an implementation of apparatus 10 of FIG. 1 according to other exemplary embodiments of the present invention. In the implementation, the circuit includes a combination of a switch and a diplexer. In particular, in the implementation of FIG. 2, apparatus 10a is provided in a wireless device 12a having a circuit 26a that includes a diplexer 42a and a switch 44a. Diplexer 42a is connected to air interface 14 via air interface connection 30 and to WCDMA receiver/transmitter 20 via connection 32. Diplexer 42a is also connected to switch 44a by connection 48, and switch 44a is connected to GSM receiver 22 via connection 34 and to GSM transmitter 24 via connection 36.

Switch 44a is operable between two states (positions). In State A, diplexer 42a is connected to GSM receiver 22 via connection 34, and in State B, the diplexer is connected to GSM transmitter 24 via connection 36. The GSM system controls the switch 44a so that when the wireless device 12a is not transmitting a GSM signal, the switch 44a is in State A.

In the apparatus 10a, when the wireless device 12a is in a WCDMA call (i.e., the wireless device is in a connected state with respect to the WCDMA system), circuit 26a thereof is set to State A. In State A, WCDMA receiver/transmitter 20 is allowed access to air interface 14 with low attenuation to transmit and receive signals. In addition, GSM receiver 22 has access to air interface 14 with low attenuation, so that the air interface can be monitored. Also, the WCDMA transmit signal is attenuated on the GSM receiver connection; and, as a result, the GSM receiver will not be blocked and can do the monitoring without any blocking air interference from the WCDMA transmitter.

With the wireless device 12a in a GSM call (i.e., the wireless device is in a connected state with respect to the GSM system), circuit 26a will switch back and forth between State A and State B. The circuits will be in State B only during transmission of GSM up-link bursts, so that the GSM up-link bursts reach the air interface with low attenuation. The circuits will be in State A the remainder of the time so that GSM down-link bursts can be received with low attenuation. This is possible since GSM is a TDMA (Time Division Multiple Access) system with reception and transmission at different times.

With the wireless device 12a in a GSM call (i.e., the wireless device is in a connected state with respect to the GSM system), and with the circuit 26a in State A, the WCDMA receiver also has access to the air interface 14 with low attenuation so that the air interface can be monitored. There will be no GSM transmit signal with the circuits in State A.

With the wireless device 12 in a GSM call with the circuit 26 in State B, the WCDMA receiver may or may not have access to the air interface with low attenuation depending on the design of the circuit. For example, circuit 26a of FIG. 2 provides access with low attenuation for the WCDMA receiver. As the GSM transmit signal is attenuated on the WCDMA receiver/transmitter connection 32, the WCDMA receiver will not be blocked by the GSM transmitter. If State B provides access to the air interface with low attenuation for the WCDMA receiver (if circuit 26a of FIG. 2 is used), then the WCDMA receiver is able to monitor the air interface just as in State A. If, on the other hand, State B does not provide low attenuation access to the air interface for the WCDMA receiver, the monitored signal will appear more attenuated to the WCDMA receiver in State B. The result is that the signal monitored by the WCDMA receiver, when in a GSM call, will have a changing power level depending on whether the GSM system is receiving or transmitting.

Accordingly, for some realizations of the circuit of the apparatus of FIG. 1, and during GSM calls with the WCDMA receiver monitoring the air interface, the received signal power to the WCDMA receiver will intermittently be significantly attenuated. A signal with this property may, if fed to a receiver with AGC (Automatic Gain Control), disrupt the function of the receiver AGC so that improper gain, or constantly changing gain, prevents or degrades monitoring. Monitoring may be prevented and/or degraded of over-flow and/or of under-flow and/or of improper averaging in detector filters.

In accordance with an exemplary embodiment of the present invention, a WCDMA receiver with AGC can be controlled during a GSM call by changing the response of the WCDMA receiver AGC by, for example, by making it faster or slower.

Figure 3:
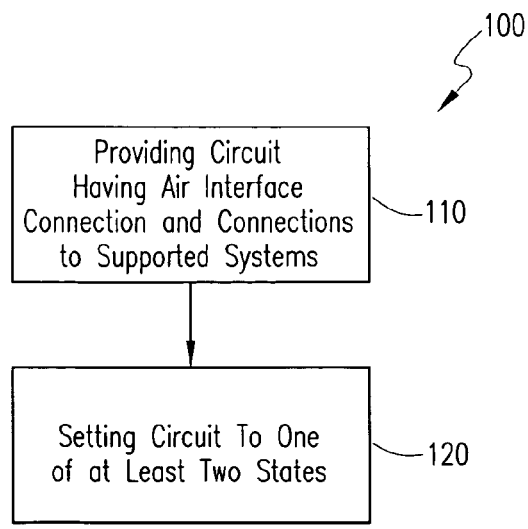
FIG. 3 is a flow chart that schematically illustrates a method for monitoring a telecommunications system with respect to which a wireless device is in an idle mode while the wireless device is in a connected mode with respect to another system according to another exemplary embodiment of the present invention.

FIG. 3 is a flow chart that schematically illustrates a method for monitoring a telecommunications system with respect to which a wireless device is in an idle mode while the wireless device is in a connected mode with respect to another system according to another exemplary embodiment of the present invention.

The method is generally designated by reference number 100 and comprises providing a wireless device with a circuit having an air interface connection and a plurality of connections to at least two access means associated with at least two telecommunications systems supported by the wireless device (step 110). The method further comprises setting the circuit to one of at least two states wherein each state provides a different attenuation between the air interface connection and one of the plurality of connections (step 120). In this way, a low attenuation can be provided between the air interface and a connection to an access means associated with one of the at least two systems with respect to which the wireless device is in a connected mode. At the same time, the circuit controls the attenuation between the air interface connection and a connection to an access means associated with a system of the at least two systems with respect to which the wireless device is in an idle mode to permit idle system monitoring.

It should be understood that the present invention should not be restricted to the specific circuits illustrated in the FIGURES. For example, the circuit can be a circuit that has a common radio frequency interface (for connecting to the air interface) and that has radio frequency interfaces for two or more wireless systems, that provides a low attenuation between the air interface connection and the connection to the access means that is associated with the connected system, and that attenuates the transmit signal from the access means associated with the connected system to the access means associated with a receiver of a system in an idle mode, and that may be set to two or more modes, where the difference between the modes is a change in attenuation between the air interface connection and another connection.

The apparatus according to the present invention can be used with all wireless devices that support multiple systems. The general method for using the circuit is to set it into a mode with low attenuation between the air interface connection and the connection to the access means associated with the system in the connected mode, which, for a TDMA system may lead to a continuously changing circuit mode. Hence, the general method also includes changing a receiver AGC response in any idle mode monitoring system due to continuously changing attenuation in the circuit.

With an apparatus for monitoring one or more systems with respect to which a wireless device is in an idle mode while the wireless device is in a connected mode with respect to another system according to the present invention, there is no need to synchronize the multiple systems supporting multiple standards. For example, there is no need to synchronize a GSM access means and a WCDMA access means of a GSM/WCDMA dual mode wireless device, and there is no need to implement compressed mode in WCDMA, thus avoiding degraded WCDMA system capacity and simplifying the wireless device design.

With embodiments of the present invention there is also negligible air interface interference between a system with respect to which the wireless device is in a connected mode and any system with respect to which the wireless device is in an idle mode. For example, there is negligible interference between WCDMA and GSM in a GSM/WCDMA wireless device design.

While what has been described constitutes exemplary embodiments of the invention, it should be recognized that the invention can be varied in many ways without departing therefrom. Accordingly, it should be understood that the invention should be limited only insofar as is required by the scope of the following claims.

We claim:

1. An apparatus for monitoring one or more supported telecommunication systems using a wireless device with respect to which the wireless device is in an idle mode while the wireless device is in a connected mode with respect to another supported telecommunication system, the apparatus comprising:
   an air interface;
   at least two access means associated with said at least two supported telecommunications systems for providing said wireless device with access to said at least two supported telecommunication systems,
   a circuit including a connection to said air interface, and a plurality of connections to said at least two access means, said circuit providing a low attenuation between the air interface connection and a connection of said plurality of connections to the access means associated with a supported telecommunication system with respect to which the wireless device is in a connected mode, said circuit further including setting means for setting the circuit to at least two states, wherein each of the at least two states provides a different attenuation between the air interface connection and one of said plurality of connections to said at least two access means; and wherein said at least two supported telecommunication systems comprise a GSM system and a WCDMA system, and wherein said setting means sets said circuit to a first state in which the circuit provides a low attenuation between the air interface connection and a connection to a receiver/transmitter of said WCDMA system, and a low attenuation between the air interface connection and a connection to a receiver of said GSM system, and a second state in which said circuit has a low attenuation between the air interface connection and a connection to a transmitter of said GSM system.

2. The apparatus according to claim 1, wherein when said circuit is in said first state, said circuit attenuates a transmit signal from said WCDMA system going to said receiver connection of said GSM system so that said receiver of said GSM system is not blocked, and wherein when said circuit is in said second state, said circuit attenuates a transmit signal from said GSM system going to the WCDMA receiver/transmitter connection so that the receiver of said WCDMA system is not blocked.

3. The apparatus according to claim 1, wherein said receiver of said WCDMA system includes automatic gain control (AGC), and wherein said circuit further includes means for changing a characteristic of said WCDMA receiver when said GSM system is in a connected state.

4. A wireless device, comprising: an air interface; a receiver and a transmitter associated with a GSM telecommunications system; a receiver/transmitter associated with a WCDMA telecommunications system; and a circuit including a connection to said air interface, a connection to said receiver/transmitter associated with said WCDMA system, a connection to said receiver associated with said GSM system and a connection to said transmitter associated with said GSM system, said circuit further including setting means for setting said circuit to first and second states, in said first state, said circuit having a low attenuation between the air interface connection and the connection to the receiver/transmitter associated with said WCDMA system, and a low attenuation between the air interface connection and the connection to the receiver associated with said GSM system, and in said second state, said circuit having a low attenuation between the air interface connection and the connection to the transmitter associated with the GSM system.

5. The wireless device according to claim 4, wherein in said first state, said circuit attenuates a transmit signal from said WCDMA system going to said connection to said receiver associated with said GSM system so that said GSM receiver is not blocked, and wherein in said second state, said circuit attenuates a transmit signal from said GSM system going to the connection to the receiver/transmitter associated with the WCDMA system so that the receiver associated with the WCDMA system is not blocked.

6. The wireless device according to claim 4, wherein the receiver associated with the WCDMA system includes automatic gain control (AGC), and wherein said circuit further includes means for changing a characteristic of said receiver when the GSM system is in a connected state.

7. The wireless device according to claim 4, wherein said setting means comprises a switch, and wherein said circuit further includes a diplexer.

8. The wireless device according to claim 7, wherein said diplexer is connected to said air interface connection, to said receiver/transmitter associated with said WCDMA system, and to said switch, and wherein said switch is connected to said receiver associated with said GSM system in said first state and to said transmitter associated with said GSM system in said second state.

9. The wireless device according to claim 4, wherein said wireless device comprises a cellular phone.

\* \* \* \* \*